United States Patent [19]

Kalem et al.

[11] Patent Number: 5,530,542
[45] Date of Patent: Jun. 25, 1996

[54] CIRCUIT AND METHOD FOR CONTROLLING GLITCHES IN LOW INTENSITY SIGNALS

[75] Inventors: Lee Kalem, Santa Clara; Robert L. Wilson, Los Gatos, both of Calif.

[73] Assignee: Hewlett-Packard Company, Palo Alto, Calif.

[21] Appl. No.: 423,236

[22] Filed: Apr. 19, 1995

[51] Int. Cl.⁶ .................................................. G01B 9/02
[52] U.S. Cl. ........................... 356/345; 356/358; 356/363
[58] Field of Search .................................. 356/345, 356, 356/357, 358, 363

[56] References Cited

U.S. PATENT DOCUMENTS

| | | | |
|---|---|---|---|
| 4,781,462 | 11/1988 | Ferriss et al. | 356/350 |
| 4,870,635 | 9/1989 | Block et al. | 356/358 |
| 4,900,151 | 2/1990 | Ulbers | 356/358 |
| 5,018,862 | 5/1991 | Aiello | 356/345 |
| 5,066,128 | 11/1991 | Lu | 356/358 |

*Primary Examiner*—Frank Gonzalez
*Assistant Examiner*—Robert Kim
*Attorney, Agent, or Firm*—Pamela Lau Kee

[57] ABSTRACT

A laser interferometer measurement system eliminates detection of "false" zero crossings in the measurement signal. The measurement signal is shifted in phase by an integrator or a differentiator. The positive portion of the shifted measurement signal is used to determine falling portions of the measurement signal while the negative portion of the shifted measurement signal is used to determine the rising portions of the measurement signal. Each portion is compared to the reference signal. A SR latch receives the result of each comparator. The output signal of the SR latch reflects the zero crossings of the measurement signal without the effects of noise.

3 Claims, 4 Drawing Sheets

CIRCUIT AND METHOD FOR CONTROLLING GLITCHES IN LOW INTENSITY SIGNALS

FIELD OF THE INVENTION

The present invention relates to precision measurements. The invention illustrates a laser interferometer measurement system that detects zero crossings of low intensity signals while minimizing the effects of noise.

BACKGROUND OF THE INVENTION

Many integrated circuit die (ICs) are manufactured on a single substrate. An IC is constructed by patterning each layer grown on the substrate. Commercially, a stepper exposes each layer with many images. Each new image must be precisely positioned over the image on the previous layer to provide a functioning IC. A laser interferometer measurement system that can resolve distances with a resolution on the order of 1 nanometer is used as part of the precision positioning system. A typical measurement system includes a source of laser light, an optical interferometer, a reflector, a receiver, and some electronics. The receiver outputs a measurement signal that changes phase as the reflector is moved with respect to the interferometer. The laser light source provides a reference signal having a constant frequency. The electronics compare the measurement signal with the reference signal to determine the distance moved by the reflector.

The phase difference between the reference and measurement signals is directly proportional to the change in position of the reflector with respect to the interferometer. The main purpose of the electronics is to accumulate this change in phase and convert it into units of position. As the reflector moves back and forth, the phase of the receiver signal increases and decreases with respect to the reference phase. The electronics must keep up with the phase of these signals, continuously incrementing or decrementing a counter to keep track of the position of the reflector.

The reference and measurement signals are sinusoidal. The electronics determine the phase of these by precisely measuring the time of their zero crossings. When phase is determined from zero crossings, it is important that when either signal crosses zero, that it is only counted once. With large laser measurement systems, the laser light from one laser source is often split into many beams to supply multiple axes. As the number of beams that split from one source increases, the intensity of the light that reaches the receivers will decrease. The electrical noise in the receiver adds to the signal from the incoming light. When a weak measurement signal crosses zero, the electrical noise may dominate and may cause detection of a "false" zero crossing (also known as a glitch). If there is just one extra zero crossing, this causes an extra 360° of phase to be accumulated by the electronics and hence an error occurs. Since the light intensity of the laser source is limited, the number of times that the light can be split from the source depends upon the sensitivity of the receiver. With complex steppers, ill is desirable to split the light beam as many times as possible. Therefore, an improvement in the sensitivity of the receiver reduces the cost of the stepper.

The phase of the measurement signal increases or decreases when the reflector position moves forward or backward. As a result, the frequency of the measurement signal changes with the velocity of the reflector. The frequency will doppler shift up for a velocity in one direction and down for a velocity in the other direction. As IC production requirements continue to increase, the demands on steppers have also increased. Large wafer runs require steppers with higher wafer throughput. Laser interferometers used in such systems must then be able to operate over a wider frequency range since the steppers must operate at higher velocities. A receiver that can operate over a wider frequency range must have a wider bandwidth. This wider bandwidth receiver will exhibit more noise, further complicating the zero crossing detection problem.

A laser interferometer measurement system that reduces detection of "false" zero crossings would allow laser signals of smaller intensity to be used. This would allow more light signals to be split off from the source and would reduce the cost of the resulting wafer stepper. It would be further beneficial if the measurement system were able to resolve differences in phase between the measurement and reference signals during higher stage velocities. This would result in more efficient positioning.

SUMMARY OF THE INVENTION

A laser interferometer measurement system that reduces detection of "false" zero crossings in the measurement signal allows laser signals of small intensity to be used. The measurement signal is shifted in phase by an integrator or a differentiator. The positive portion of the shifted measurement signal corresponds to the falling portions in the measurement signal while the negative portion of the shifted measurement signal corresponds to the rising portions in the measurement signal. Each portion of the shifted measurement signal is compared to the unshifted measurement signal. A SR latch receives the result of each comparator. The output signal of the SR latch reflects the zero crossings of the measurement signal without the effects of noise.

DETAILED DESCRIPTION OF THE PREFERRED EMBODIMENTS

Figure 1:
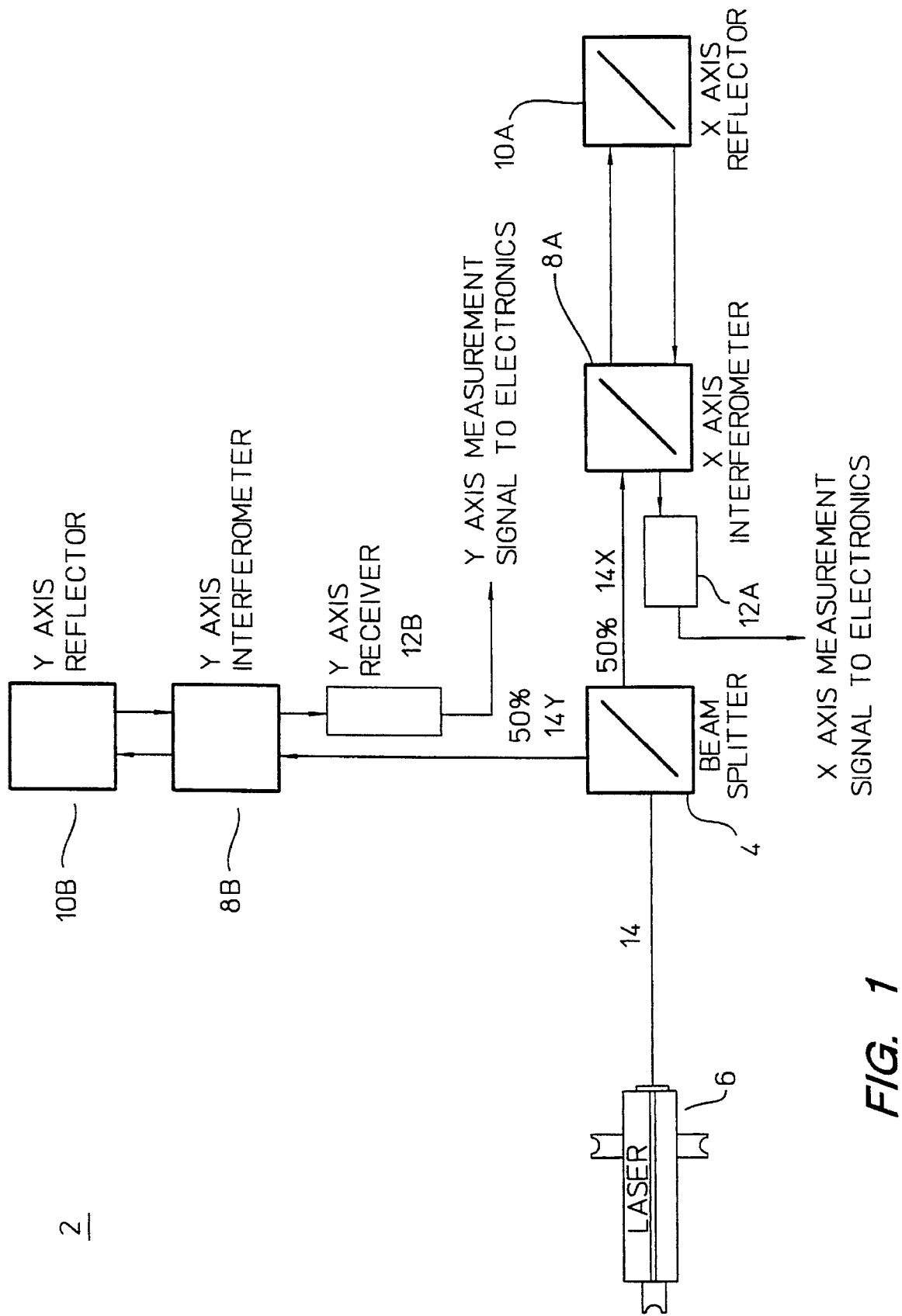
FIG. 1 illustrates a functional block diagram for a laser interferometer measurement system.

FIG. 1 illustrates a functional block diagram for a laser interferometer measurement system 2. A beam splitter 4 is positioned near a laser 6. Along each axis, there is an interferometer 8A, 8B positioned in the path of the beam from beam splitter 4. The beam passes through an interferometer 8A, 8B until it reflects back from a reflector 10A, 10B and finally terminates in a receiver 12A, 12B.

A laser beam 14 that is generated from a laser 6 is received by a beam splitter 4. In this embodiment, the beam splitter 4 splits the laser beam into an x-axis beam. $14_x$ and a y-axis beam $14_y$. The x-axis beam $14_x$ is received by the x-axis interferometer 8A, which in turn emits the x-axis beam $14_x$ that is reflected off the x-axis reflector 10A. The reflected x-axis beam $14_x$ passes back through the x-axis interferometer 8A and is then received by the x-axis receiver 12A. The x-axis receiver 12A passes the measurement signal to measurement electronics (not shown). Motion of the reflector 10A relative to the interferometer changes the measurement signal.

Figure 2:
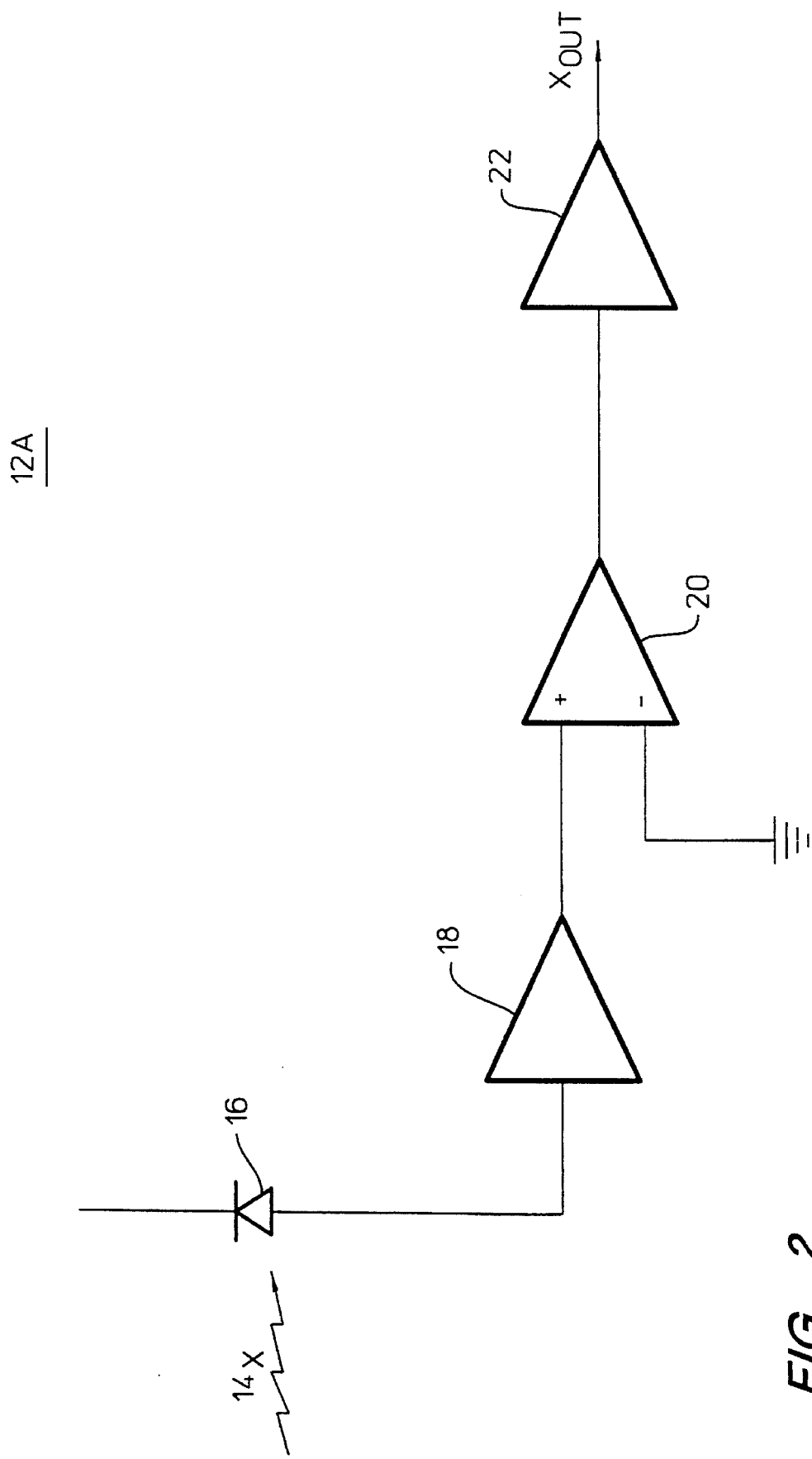
FIG. 2 illustrates a functional block diagram for the receiver shown in FIG. 1.

FIG. 2 illustrates a functional block diagram for the x-axis receiver 12A shown in FIG. 1. A photodiode 16 receives the x-axis beam 14$_x$. An amplifier 18 is connected to the photodiode 16 and a zero crossing detection circuit 20. An output driver 22 is connected to the zero crossing detection circuit 20.

Figure 3:
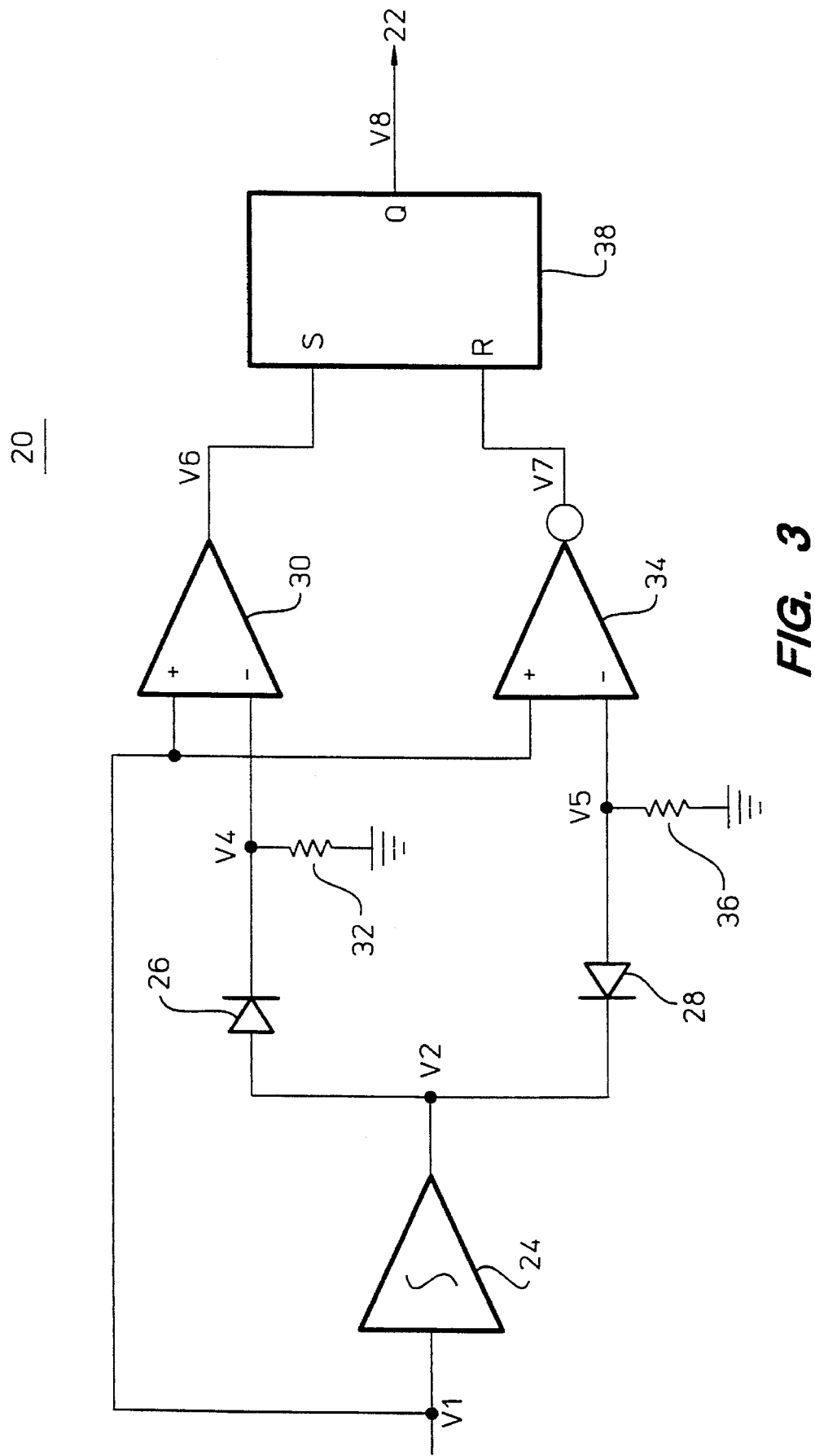
FIG. 3 illustrates a functional block diagram for the zero crossing detection circuit shown in FIG. 2.

FIG. 3 illustrates a functional block diagram for the zero crossing detection circuit 20 shown in FIG. 2. A phase shifter 24, such as an integrator, has an input and an output terminal. A forward-connected diode 26 and a reverse-connected diode 28 connect to the output of the phase-shifter 24. The forward-connected diode 26 connects to a first comparator 30 at the negative input. A first resistor 32 is connected between the negative input of the first comparator 30 and ground. The reverse-connected diode 28 connects to a second comparator 34 at the negative input. A second resistor 36 is connected between the negative input of the second comparator 34 and ground. The positive input of the first comparator 30 and the second comparator 34 receive the unshifted measurement signal. The output of the first comparator 30 is connected to a set terminal of a SR latch 38. The output of the second comparator 34 is connected to a reset terminal of the SR latch 38. The output signal of the SR latch 38 reflects the zero crossings of the unshifted measurement signal without noise.

The unshifted measurement signal appears on the input of the phase shifter 24. The output of the phase shifter 24 is a shifted measurement signal that is passed to the comparators 30, 34. The first comparator 30 receives the positive portion of the shifted measurement signal while the second comparator 34 receives the negative portion of the shifted measurement signal. The positive portion of the shifted measurement signal corresponds to the falling zero crossings while the negative portion of the shifted measurement signal corresponds to the rising zero crossings. When the unshifted measurement signal has a rising zero crossing, the SR flip-flop 38 is set and produces a "HIGH" output. Similarly, when the unshifted measurement signal has a falling zero crossing, the SR latch 38 is reset and produces a "LOW" output.

Alternatively, a differentiator may be used as the phase shifter instead of the integrator. This would create a 90° phase shift that is leading as opposed to the lagging phase shift created by the integrator. An inverting amplifier would be applied after the differentiator to maintain the proper phase relationship of the V4 and V5 signals. The differentiator has the undesirable characteristic of amplifying high frequencies more than the low frequencies. This tends to undesirably decrease the amplitude on the negative inputs of the first and second comparators for lower frequencies. The integrator implementation beneficially increases the amplitude on negative inputs of the first and the second comparators at lower frequencies. This is needed because the noise on V1 is more likely to cause multiple zero crossings at lower frequencies because the slope of the sine wave at the zero crossings is lower at lower frequencies. Since the gain of the integrator is greater at lower frequencies, it offsets the "greater sensitivity to noise at lower frequencies" effect.

Figure 4:
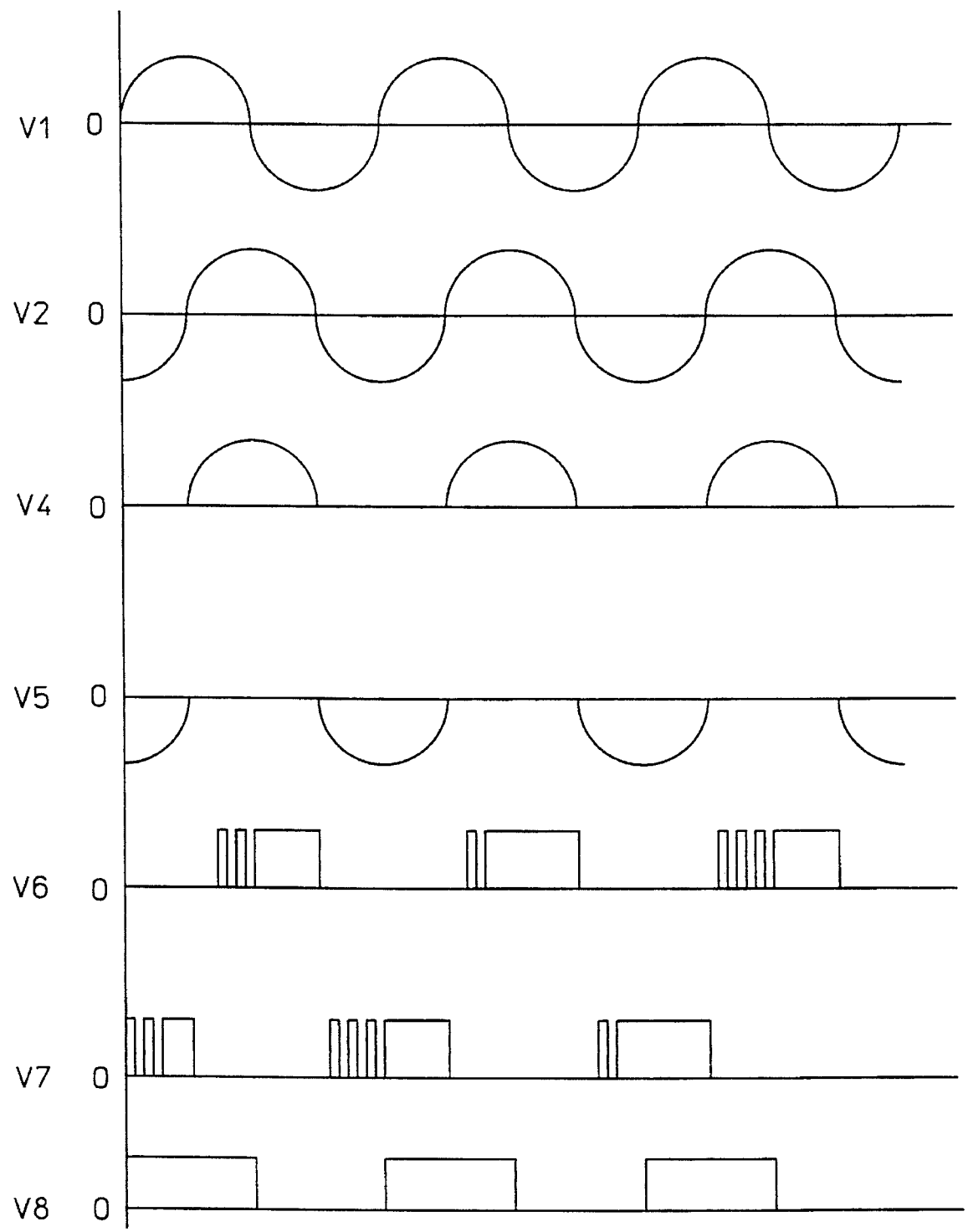
FIG. 4 illustrates the signal waveforms at various points.

FIG. 4 illustrates the signal waveforms at various points. The forward-connected diode 26 and the reverse-connected diode 28 separate the shifted measurement signal into a positive portion and a negative portion, respectively, to prevent one comparator output from changing while the other is changing. The positive portion corresponds to the falling zero crossings of the unshifted measurement signal while the negative portion corresponds to the rising zero crossings of the measurement signal. The first comparator 30 compares the positive portion with the unshifted measurement signal while the second comparator 34 compares the negative portion with the unshifted measurement signal. The SR latch 38 receives the result of each comparator. The output signal of the SR latch 38 reflects the zero crossings of the measurement signal without the effects of noise. The output of the second comparator 32 has been inverted so the signal can be used to reset the SR latch 38.

With the rising zero crossing of the measurement signal V1, the noise causes the measurement signal to have multiple zero crossings rather than just one zero cross, ling. The SR latch 38 will be set by the first rising zero crossing. Since the second comparator 34 is disabled during this time (the output V7 is "LOW"), the SR latch 38 cannot be reset. Thus the output of the SR latch 38 goes "HIGH" just once, even though the output of the first comparator 30 may jitter high and low multiple times. Similarly, during the falling zero crossings of the unshifted measurement signal, the first comparator 30 is disabled and the first falling zero crossing resets the SR latch 38, just once despite the output of the second comparator 34 jittering high and low multiple times. The output of the SR latch 38 can be seen to follow the waveform of the unshifted measurement signal but without the multiple zero crossings.

We claim:

1. A glitch reduction circuit for low intensity signals comprises:

a phase shifter having an output, receiving a measurement signal;

a forward-connected diode connected to the output of the phase shifter;

a first comparator having a first positive and a first negative terminal, having a first output terminal, the first negative terminal connecting to the forward connected diode;

a first resistor connecting between the first negative terminal and ground;

a reverse-connected diode connected to the output of the phase shifter;

a second comparator having a second positive and a second negative terminal, having a second output terminal, the second negative terminal connecting to the reverse-connected diode;

a second resistor connecting between the second negative terminal and ground;

wherein the first positive terminal and the second positive terminal receive the measurement signal; and a SR latch, having a set terminal connecting to the first output terminal and a reset terminal connecting to the second output terminal.

2. A glitch reduction circuit, as defined in claim 1, wherein the phase shifter is an integrator.

3. A glitch reduction circuit, as defined in claim 1, wherein the phase shifter is a differentiator.

* * * * *